Aug. 29, 1939.   W. J. PELTIER   2,171,147
METHOD OF AND APPARATUS FOR CONTROLLED AIR CONDITIONING
Filed May 20, 1935   4 Sheets-Sheet 1

INVENTOR
WILLIAM J. PELTIER
BY HIS ATTORNEYS

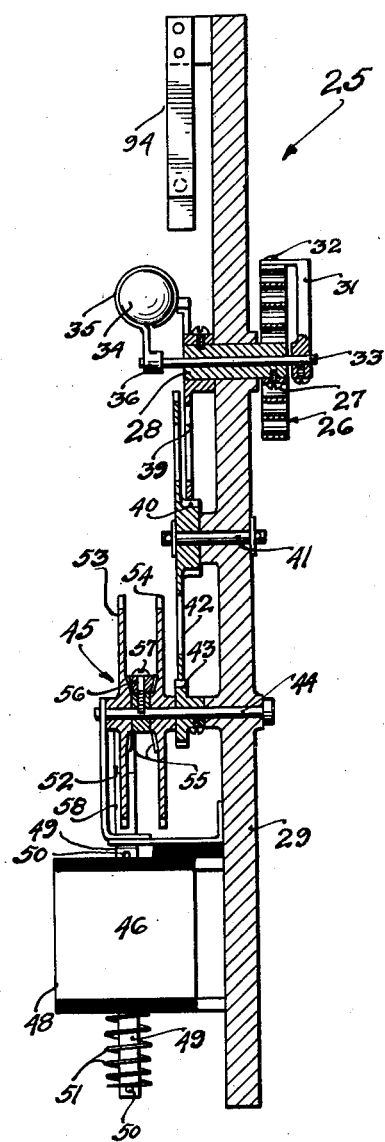
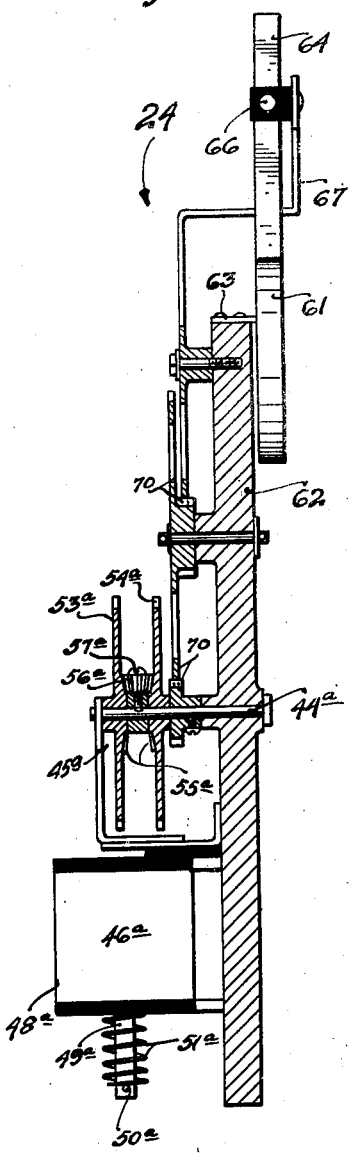

Aug. 29, 1939.  W. J. PELTIER  2,171,147
METHOD OF AND APPARATUS FOR CONTROLLED AIR CONDITIONING
Filed May 20, 1935  4 Sheets-Sheet 3

INVENTOR
WILLIAM J. PELTIER
BY HIS ATTORNEYS
Merchant + Kilgne

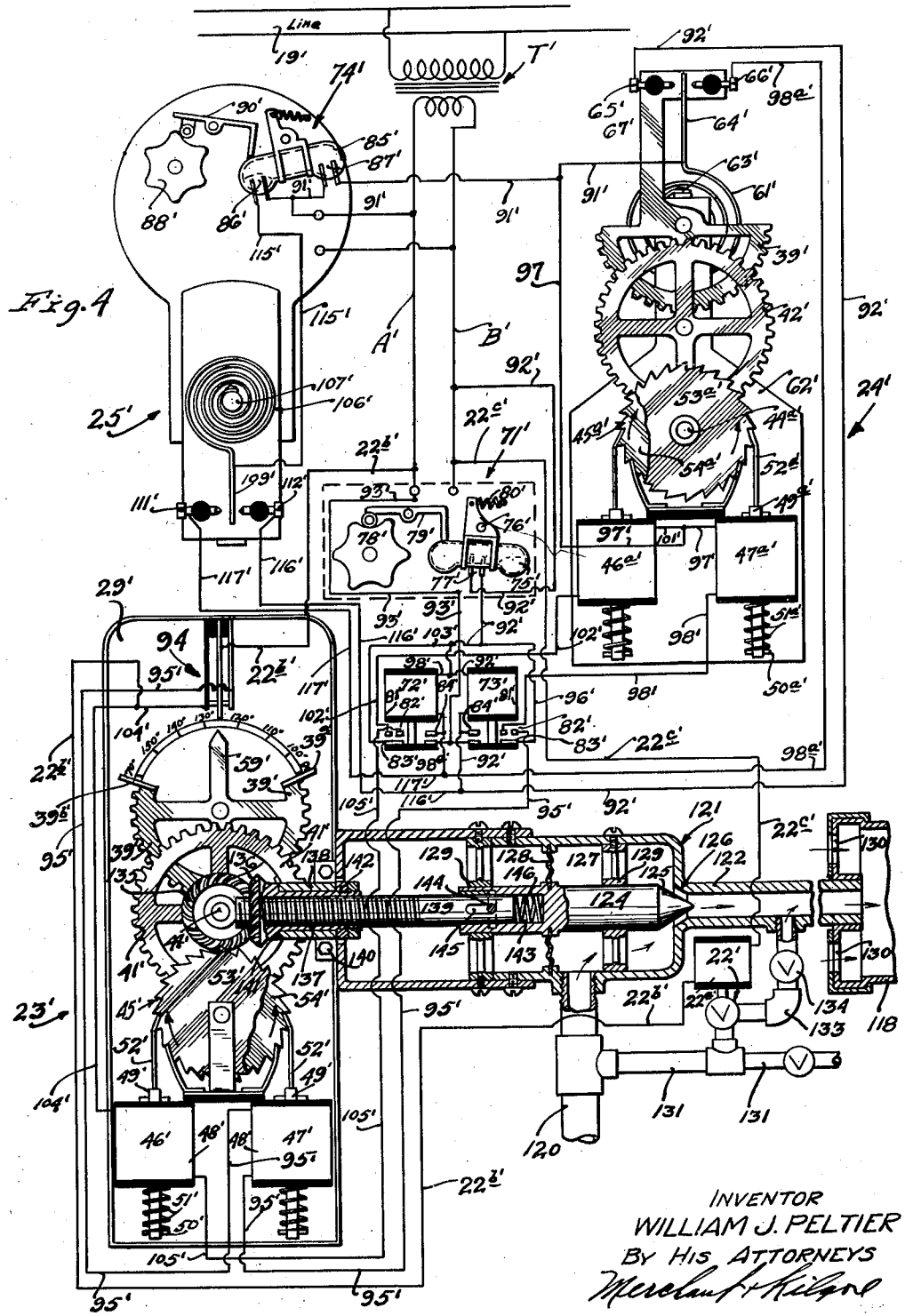

Patented Aug. 29, 1939

2,171,147

UNITED STATES PATENT OFFICE

2,171,147

METHOD OF AND APPARATUS FOR CONTROLLED AIR CONDITIONING

William J. Peltier, Minneapolis, Minn., assignor of one-third to Merchant & Merchant, Minneapolis, Minn.

Application May 20, 1935, Serial No. 22,394

4 Claims. (Cl. 236—91)

My present invention relates to improved methods of and apparatus for air conditioning and more particularly, but not essentially, to that class of air conditioning having to do with temperature maintenance. Whereas the method or methods and two forms of the improved apparatus, herein specifically disclosed, relate to temperature maintenance by controlled application of heat and each of said forms of apparatus includes a heating system employing water as a heat transfer medium, it should be understood that the invention may involve other phases of air conditioning or be employed in connection with or incorporate other types of air tempering apparatus or systems, such, for example, as hot air heating systems, heating systems employing steam as a heating medium, various types of cooling apparatus or humidifying or dehumidifying apparatus.

Generally stated, the invention consists of novel methods, novel devices, combinations of devices and arrangement of parts hereinafter described and defined in the claims, and has as an object, the provision of improved methods of and apparatus for controlled air conditioning.

Another important object of the invention is the provision of improved methods of and/or apparatus for accurate control of an air condition in an enclosed space. In the temperature maintenance branch of air conditioning, the invention has among its objects to provide improved methods of and/or apparatus for accurately controlling the temperature of an enclosed space. As applying more particularly to the field of heating, the invention has among its objects to provide improved methods of and/or apparatus for accurately controlling application of heat to a space so as to maintain an unusually uniform temperature in the space.

The above and other important objects and advantages of the invention, as well as the improved methods and apparatus thereof, will be understood from the specification and claims.

In the accompanying drawings, which illustrate the invention, like characters indicate like parts throughout the several views.

Referring to the drawings:

Fig. 2 is an enlarged sectional view taken approximately on the line 2—2 of Fig. 1;

Fig. 4 is a view similar in character to Fig. 1, but is illustrative of a somewhat different form of the invention which is particularly adapted for use in connection with a heating system employing a continuously operating but variable source of heat, such as variable flame gas burner;

Fig. 5 is an enlarged sectional view taken on the line 5—5 of Fig. 1; and

Figure 3:
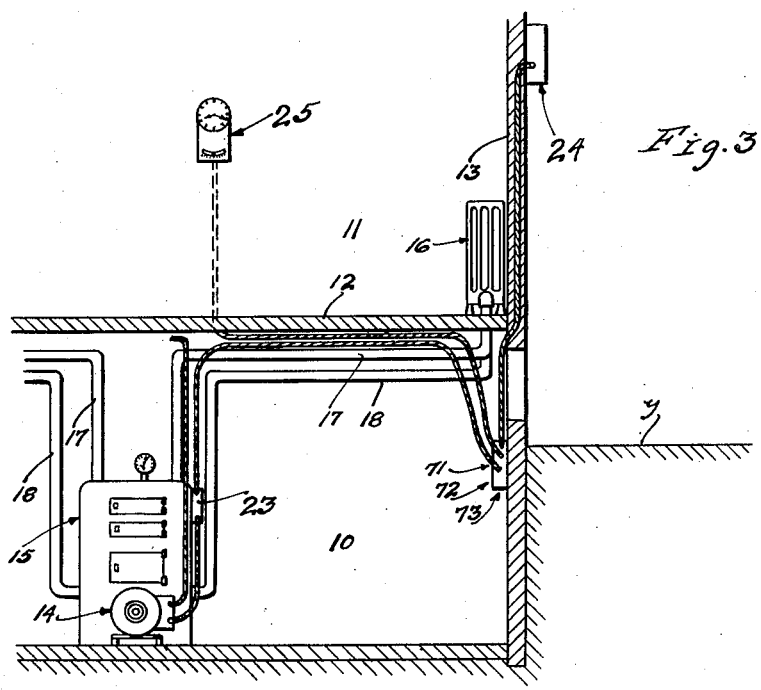
Fig. 3 is a view partly in section and partly in elevation illustrating a preferred application of the control mechanism of Figs. 1 and 2.

In Fig. 3, the boiler room of a building is indicated by 10, an upper room or space to be heated by 11, a first story floor by 12, an outside wall of a building by 13, and the earth around the building by Y. In this figure the air condition or tempering apparatus is in the nature of a conventional heating system. This heating system comprises a heater, in the form of an oil burner, a conventional hot water boiler 15, a conventional radiator or radiators 16, located in the space or room 11 to be heated, and heating medium circulating connections 17 and 18 between the boiler 15 and radiator or radiators 16. The boiler 15, radiator or radiators 16 and the circulating connections 17 and 18 constitute means for transferring heat from the oil burning heater 14 to the space to be heated. For the purpose of this case, the oil burner 14 may be assumed to be of the conventional intermittently operating gun type provided with automatic ignition. The burner motor 14a may be supplied with current from any suitable source, such as the conventional power and light line 19 through leads 20 and 21. In accordance with established practice, a burner control relay switch 22 is interposed in lead 20 of the burner supply circuit. The relay 22 is of the normally gravity open type, and the solenoid coil thereof is indicated by 22a. The oil burning heater 14 is automatically controlled, through the medium of the relay 22 by means of a control system comprising one form of the present invention and below described.

Figure 1:
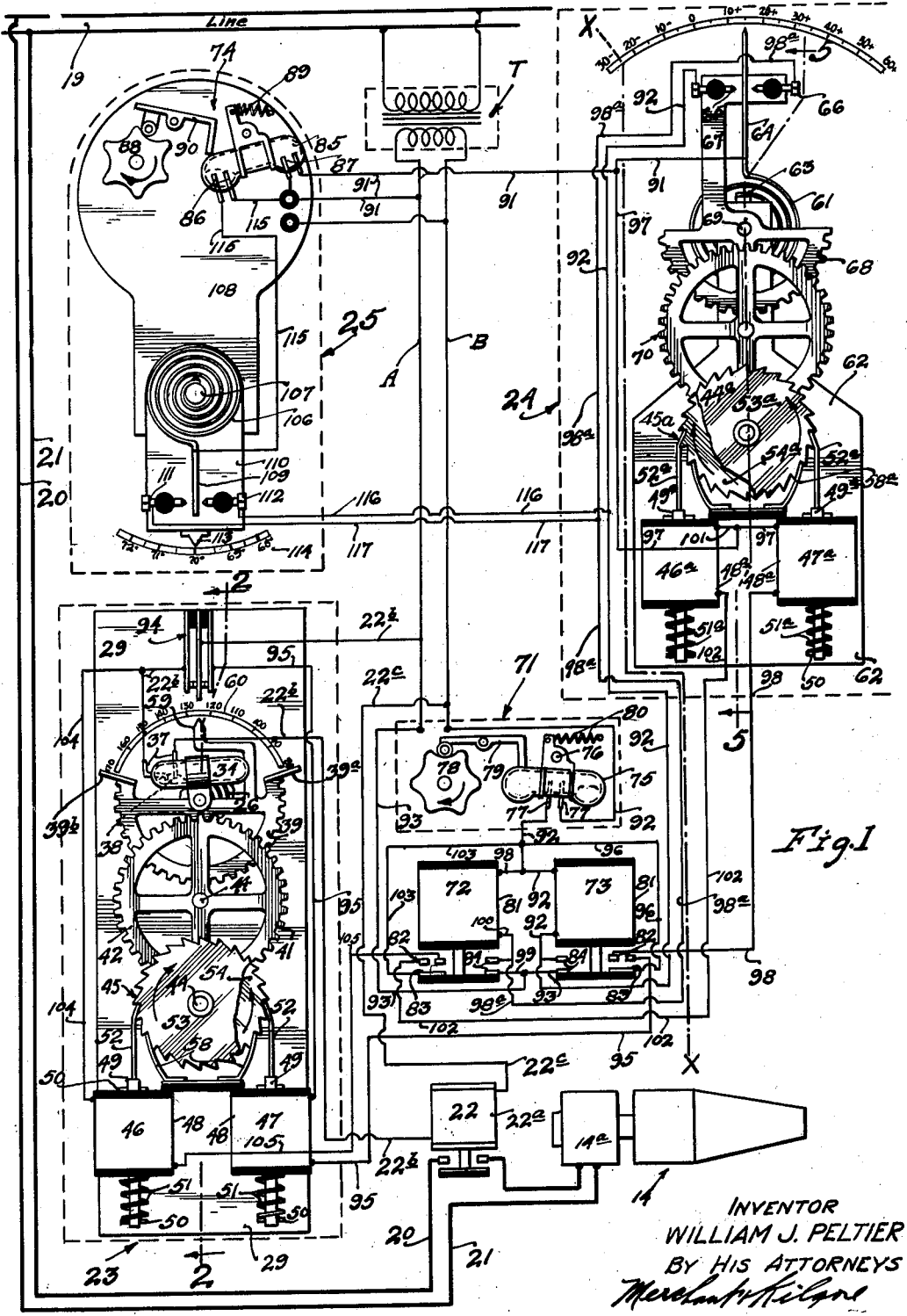
Fig. 1 is a view partly in elevation and partly in wiring diagram illustrating a form or adaptation of the invention which is particularly adapted for use in connection with heating systems employing water as a heat transfer medium, and an intermittently operated source of heat such as an oil burner.

Before proceeding with a detailed description of my improved control apparatus and method as exemplified in Figs. 1 to 3, inclusive, I submit the following brief analysis of the heating phase of air conditioning and some important facts in connection therewith.

In any building, a certain definite heat loss will exist under any particular set of variable demand conditions such, for example, as outdoor temperature, wind velocity, and heat loss through controlled ventilation, and only when some one or more of these are varied, will the heat loss, as measured by B. t. u., be varied. Hence, if such heat loss under any existing set of conditions is determined and heat is suplied to the space in quantity equalling the heat loss, the temperature will remain constant within the enclosure. With the heating system of the kind illustrated in Fig. 3, the effective heat output rate of the oil burning heater or the effective heat input rate thereof to the space may be measured by the average maintained temperature of the heating medium, and for different demand conditions, different heating medium temperatures will be required to maintain a desired space temperature, say 70 degrees. However, for the present example, it may be assumed that building conditions are such that at an outdoor temperature of 15 degrees above zero and average wind velocity and ventilation conditions, an average heating medium temperature of 125 degrees at the boiler will be necessary to maintain an average temperature of 70 degrees in the space. Obviously, if the effective heating rate of the oil burning heater 14, as measured in the present instance by heating medium temperature, is maintained consistently at the level necessary to supply heat to the space at a rate equalling the heat loss from the space, the space temperature will be maintained exactly at the desired 70 degree temperature.

Likewise, if the heating medium temperature is permitted to fluctuate materially above and below the required level, such heating medium temperature fluctuations will be felt in the space in the nature of lesser but objectionable rises above and falls below desired space temperature. It is a matter of common knowledge that such fluctuations result in discomfort and fuel waste varying in extents proportionate to and in the direction of variations in the extent of said fluctuations.

It has been found by experiment that, whereas individual buildings vary greatly as to required heat inputs at the same outside temperatures, once the heat input rate necessary to maintain any average buliding at a desired temperature, of say 70 degrees, is established with respect to any particular outside temperature, the desired space temperature can be substantially maintained through the entire heating range by thereafter varying the heat input rate inversely in proportion to outside temperature rises and falls. Hence, in a system of the kind described in Figs. 1 to 3, inclusive, wherein boiler water temperature may be used as a medium for measuring the effective heat input rate to the space, it may be said that once the boiler water temperature necessary to maintain the space temperature at the desired 70 degrees is established for any particular outside temperature, the desired space temperature can thereafter be substantially maintained by thereafter varying the primarily established boiler water temperature inversely in proportion to outside temperature fluctuations.

The above statements are, of course, only relatively accurate and are made without respect to heat demand conditions, other than outside temperature such, for example, as variable heat loss through controlled ventilation, mainly windows, and varying wind velocity.

From the above brief analysis of the heating situation it will be evident that the most ideal automatic control system for heating systems is one which will so automatically regulate the effective heating rate of the heater that the heat input to the space being heated will exactly equal the heat loss therefrom through the entire heating range. Many inventors have worked toward this end and, although steady progress toward this end has been made, it is a recognized fact that hitherto produced control systems have left a great deal to be desired from the standpoint of efficiency of operation with respect to the above noted objective and also from the standpoints of dependability of operation and initial cost of control apparatus. However, the methods and apparatus herein disclosed make such ideal results readily accomplished or at least so closely approached as to leave little if anything to be desired by way of accurate temperature maintenance, and furthermore, as will be evident, the necessary equipment is relatively simple, cheap to produce and dependable of operation.

*Description of control apparatus of Figs. 1 to 3, inclusive*

The particular arrangement illustrated in Figs. 1 to 3, inclusive, is made up of three principal units, to wit: an adjustable tempering rate control 23 located preferably at the boiler 15; a primary adjustor 24 located outside of the building; and a secondary adjustor 25 located in the space 11.

The adjustable tempering rate control is provided with a thermostat 26 so located in respect to the boiler heating medium as to respond to very small changes in temperature of the heating medium. This thermostat 26 is herein illustrated as being in the nature of a flat spiral, but in practice, would preferably be of the well known cylindrical submersion type. Whereas, the thermostat 26 can be associated with the heating medium at other points in the system, experiments have shown that best results are obtained by associating the same with the heating medium at the boiler. The thermostat spiral 26 is rigidly anchored, at its inner end, at 27 to a sleeve 28 that is journaled in and projects through a mounting plate 29 upon which all parts of the adjustable tempering rate control mechanism 23 are mounted. The free outer end of the thermostat spiral 26 is anchored to the free end of a lever 31 at 32, said lever 31 being rigidly anchored to a spindle 33 that is journaled in the sleeve 28. This sleeve 28, at its end opposite the lever 31, carries a mercury bulb switch 34 through the medium of a spring clip 35 that terminates in a hub 36 which is mounted fast on the spindle 33. The switch 34 is provided, at one end portion, with co-operating contacts 37 that are adapted to be closed by a globule of mercury 38 when the switch is tilted in one direction beyond a horizontal position and which contacts are open when the switch tube is tilted beyond a horizontal position in the other direction.

The switch 34 controls the supply circuit of the solenoid 22a of burner relay switch 22 and hence said switch 34 and its actuating thermostat may be considered the heater control proper. The said circuit of the relay solenoid 22a comprises leads 22b and 22c that extend from low voltage supply leads A and B, respectively. The control switch 34 is interposed in lead 22b. Leads A and B extend from the low voltage secondary winding of a step-down transformer T, which serves as a source of low voltage for the entire control apparatus and has its primary connected to opposite leads of line 19.

The sleeve 28 is normally held against rotation by but is adjustably rotatable by mechanism comprising a segmental gear 39 mounted fast on the inner end of the sleeve, a pinion gear 40 journaled on a fixed axis 41 and meshing with the segmental gear 39, a large reduction gear 42 mounted rigidly on or formed as a part of the pinion 40, a pinion 43 mounted fast on a journaled spindle 44 and meshing with the large gear 42, and reversible motor means immediately to be described.

The reversible motor means above referred to incorporates a differential unit, indicated as an entirety by 45, interposed between and operatively connecting motivating units 46 and 47 to the pinion gear 43. The motivating units 46 and 47 each comprise a solenoid coil 48 equipped with a floating plunger-like core 49, said cores 49 being provided at opposite sides of the solenoids 48 with stop pins 50 and being normally downwardly retracted by light coiled compression springs 51. The plungers 49 are provided with upwardly extending projections in the nature of spring fingers 52, the free ends of which are slightly inturned to serve as ratchet-actuating dogs. As illustrated, the units 46 and 47 are rigidly mounted on the mounting base or plate 29. The differential unit 45 comprises like ratchet wheels 53 and 54 mounted in opposed and reverse relation on an extended end portion of the spindle 44 for free rotary movements in respect thereto. These ratchet wheels 53 and 54 are formed in opposed relation with bevel gears 55 that intermesh with a common planetary pinion 56, the pinion 56 being carried by and journaled in respect to the spindle 44 on a screw or the like 57. The dog-acting end of spring finger 52 of motivating unit 46 engages ratchet wheel 53 and the dog-acting end of spring finger 52 of motivating unit 47 engages ratchet wheel 54.

When the solenoid coil 48 of the motivating unit 46 is energized, the plunger-acting core 49 thereof will move upwardly to the limit permitted by spacing of the stop pins 50 and will impart such movement to the ratchet wheel 53, and when the solenoid 48 of the motivating unit 47 is energized, its plunger-acting core will impart like movement to its co-operating ratchet wheel 54. The stop pins 50 will, of course, be so spaced that movements of the plungers will be limited to a distance equal to the space of one tooth on the ratchet wheel. The movements imparted to the ratchet wheels 53 or 54 by their respective motivators 46 or 47 are, of course, opposite in direction and are thus transmitted to the inner end of the thermostat spiral 26 through the train of gears 39 to 43, inclusive, and the adjustably rotatable sleeve 28. Any desired amount of adjusting movements in either direction can be imparted to the sleeve 28 and the inner end of the spiral thermostat 26 by successive operation of the correct motivating unit 46 or 47, and such adjusting movements will determine the critical range of the thermostat, to wit: the temperatures between which it will tilt the switch 34 to open and closed positions.

The sensitivity of the thermostat 26 and the resultant fluctuation which will be permitted in boiler water temperature above and below the point determined by adjustment of the thermostat, may obviously be varied to meet different requirements, but in systems of the kind illustrated in Figs. 1 to 3, it has been found desirable to employ a thermostat having such a degree of sensitivity that it will turn the burner on and off in response to about five degree variation in boiler water temperature. Such a small variation in boiler water temperature has negligible effect in the space being heated, the boiler temperature being maintained within two and a half degrees above and below the selected point. For the purpose of preventing accidental backward movements of the ratchet wheels 53 and 54, there is provided anti-reversing springs 58 mounted on the solenoid coils 46 and 47 and end engaging a ratchet with light spring tension.

Mainly for the purpose of illustration, the gear segment 39 of the controlled unit 23 is provided with an indicating pointer 59 that works over a calibrated scale 60 on the underlying base plate 29. This scale 60 is calibrated through the operative boiler temperature range of from 80 degrees F. to 170 degrees F. In accordance with the example set out earlier, the indicating pointer is adjustably positioned at 135 degrees and with the adjustments so made, the water temperature at the boiler will be maintained within two and a half degrees above or below the selected 135 degree point. It is important to bear in mind that the control unit comprising thermostat 26 and switch 34 operates to maintain the effective heat output of the oil burning heater, and the effective heat input rate to the space, all as measured by boiler water temperature at any selected point, and does this independently of any and all space or outside heat demand conditions. The control units 24 and 25 and associated apparatus to be described are auxiliary to and merely function to adjust the critical point of the thermostatic control 26 at the proper point for various different demand conditions.

The adjusting control unit 24 is placed where it is subject to outside atmospheric conditions and is preferably, and as illustrated, mounted on an outer wall of the building. This control 24 includes a thermostat 61 in the nature of a flat spiral rigidly anchored at its inner end to a mounting base 62 at 63, and provided at its outer portion with an integrally formed blade 64, which latter, as will hereinafter appear, serves as a switch arm. The blade 64 works between opposed switch contacts 65 and 66 that are mounted on but insulated from an oscillatory arm 67.

The oscillatory switch contact carrier arm 67 is formed as a projection of a gear segment 68, which gear segment is journaled on a pivot pin 69 projecting from the base plate 62 in concentric relation to the axis of the spiral thermostat 61. The gear segment 68 is operatively connected through a train of gears 70 to a reversible differential motor of the same type described in connection with control unit 23, and since the same has once been described, repetition is omitted and the parts thereof are indicated by characters that correspond to those assigned to like parts in Fig. 1, plus the exponent "a."

The switch-acting blade 64 projects considerably beyond the contacts 65 and 66 and the free end thereof serves as an indicating pointer for co-operation with a scale calibrated in degrees Fahrenheit from 30 degrees below zero, to 60 degrees above zero, said scale representing the complete heat-requiring range of outside temperatures.

The following elements are interposed between the adjusting control unit 24 and the adjustable tempering rate control unit 23, and serve as co-operative coupling units, to wit: a motor-driven circuit interrupter or flash circuit maker 71, a pair of electro-magnetic relay switches 72 and 73, and a motor-driven selector switch 74. The motor-driven circuit interrupter or flash circuit maker 71, as illustrated, is in the nature of a flash contact mercury bulb switch 75 mounted for oscillatory pivotal movements at 76 and equipped at its intermediate portion with a pair of contacts 77 that are adapted to be momentarily closed by a globule of mercury passing therethrough under tilting movements of the bulb through a horizontal position.

This switch bulb 75 is intermittently oscillated from one side of horizontal to the other side by means of a motor-driven cam wheel 78 through the medium of an intermediately pivoted lever 79, and a return spring 80. The motor driving the cam wheel 78 is not here shown, but may be assumed to be of the continuously running electric clock type. The relay switches 72 and 73 are conventional in character, and each include a solenoid 81, a pair of normally open fixed contacts 82 co-operating with and adapted to be closed by a movable contact 83, and a co-operating pair of contacts 84, one of which is movable and the other of which is fixed. The motor-driven selector switch 74 includes a pivotally mounted mercury bulb switch 85 having a co-operating pair of contacts 86 at one end, and a co-operating pair of contacts 87 at its other end, opposite of said pairs of contacts being adapted to be alternately closed by a globule of mercury under pivotal movements from one side of horizontal position to the other side. The mercury bulb 85 is alternately tilted from one side of horizontal position to the other side through the combined action of a continuously operating cam wheel 88 and a return tension spring 89, the cam wheel 88 operating through the medium of an intermediately pivoted lever 90 and is driven by a suitable continuously operating electric clock type motor. Whereas the selector switch 74 is herein illustrated as being incorporated as part of the adjusting control unit 25, it would be preferable in practice to build the same in unit with the circuit interrupter 71 and in this case, the intermediately pivoted bulb-actuating arm 90 could be operated from the cam wheel 78, thereby saving the cost of one motor and cam wheel.

It is here important to note, by reference to Fig. 1, that the thermostat blade 64 of unit 24, besides serving as a switch arm as it swings back and forth in response to outside temperature changes, also serves in conjunction with its co-operating scale, as a mechanical type thermometer to indicate the outdoor temperature. In this respect, it will be seen that the blade 64, as positioned, indicates an atmospheric temperature of fifteen degrees above zero, and the indicating pointer 59 of control unit 23 indicates a boiler water temperature setting of 125 degrees, which boiler water temperature, in accordance with the example previously set out, will give the correct heat input to the space for the indicated existing outdoor temperature of fifteen degrees above zero. The matter of how the thermostat 26 became primarily adjusted to the correct critical position is not important and for the present, suffice it to say that it has been properly set.

Now it will be evident that as long as demand conditions, mainly outdoor temperature, remain as indicated, the primarily established boiler water temperature of 125 degrees will be satisfactory and will result in constant maintenance in the space of the desired 70 degree temperature, and also, it will be evident that the switch-acting thermostat blade 64 will remain approximately centered between the contacts 65 and 66. If, however, we assume now that the atmospheric temperature outdoors begins to drop, the blade 64 will begin moving in a counter-clockwise down scale direction in respect to Fig. 1, in direct proportion to such temperature drops. When the temperature has dropped a fraction of a degree, for example, one-half a degree, the blade 64 will make contact with its co-operating contact 65 and will close a circuit through solenoid 81 of relay coil 73. This circuit through solenoid 81 of relay 73 comprises a lead 91 extending from one side of the secondary of transformer T through a portion of lead A to switch blade 64 through contacts 87 of selector switch bulb 85, a lead 92 extending from contact 65 to the other side of the secondary of transformer T through solenoid 81 of relay 73, contacts 77 of switch 75 and lead B.

This circuit through solenoid 81 of relay 73 will be momentarily completed when switch bulb 85 of selector switch 74 is tilted to the opposite position from that shown in Fig. 1, and during which time, the switch 75 of the interrupter 71 will pass through a horizontal position. At this point, it is well to note that whereas the cam wheels 88 and 78 are alike and rotate at the same speed, one thereof is advanced slightly, for example, one-quarter of the distance between cam centers, in respect to the other thereof so that the flash circuit maker switch 75 will always pass through horizontal position and cause closing of its contacts 77 for a short interval during the time the switch 85 of selector 74 is in either of its opposite circuit-closing positions. During this momentary completion of the circuit through solenoid 81 of relay 73, the relay 73 will close its switch contacts 82 with their co-operating contact 83 and will also close its co-operating contacts 84, thereby establishing for the moment three distinct circuits, to wit:

(a) A holding circuit extending from one side of transformer T to the movable of contacts 84 of relay 73 through lead A and a lead 93, through co-operating closed contacts 84 of relay 72, to the other side of the transformer secondary through solenoid 81 of relay 73, switch contacts 77 of flash circuit maker switch 75 and leads 92 and lead B.

(b) A circuit extending from one side of the secondary of transformer T, to the right-hand one of contacts 82 of relay 73 through the major portion of lead A, a portion of lead 22b terminating at a high-low limit control switch 94, to be hereinafter described, through switch 94 and a lead 95 having interposed therein the solenoid 48 of motivating unit 47, and returning to the opposite side of the transformer secondary through contact 83 of relay 73, the right-hand one of the pair of contacts 82 of relay 73, a lead 96, a portion of lead 92 having interposed therein switch contacts 77 of flash circuit maker 71, and lead B; and (c) A circuit for solenoid 48a of motivator 47a of adjusting control 24, comprising a portion of lead A extending from one side of the transformer secondary, lead 91, including contacts 87 of selector switch 74, to and through a lead 97 to solenoid 48a of motivator 47a, lead 98 from the said solenoid 48a to the left-hand one of contacts 82 of relay switch 73, and returning to the opposite side of transformer secondary through contact 83 of relay 73, lead 96, lead 92 through switch 75 of the flash circuit maker 71 and lead B.

The making of the three circuits (a), (b) and (c) above noted will, of course, be only momentary, due to the intermittent action of the flash circuit maker 71, and in this respect, attention is called to the fact that whereas the timing of the cam wheels 88 and 78 may be varied considerably, it has been found, in practice, that such timing as will result in tilting of the mercury bulbs 85 and 75 through one complete oscillation every five minutes is usually satisfactory. It will, of course, be obvious that the circuits (a), (b) and (c) above described will be intermittently made every succeeding five minutes, as long as blade 64 remains in engagement with contact 65.

This momentary closing of the circuits just above noted results in one operation of the solenoid 48 of motivator 47 and simultaneously therewith one operation of motivator 47a. The operation or series of operations of the motivator 47 will act to reset the thermostat 26 to a higher boiler temperature maintaining position and such up-scale adjustment will be indicated by the pointer 59 with relation to the scale 60. Now as stated, the number of operations and hence the extent of increase temperature setting of the thermostat 26 will be determined by the length of time the blade 64 remains in engagement with contact 65. The motivators 47 and 47a are operated a like number of times, and it will be seen that for each operation of motivator 47a, the contact arm 67 will be slightly rotated in a counter-clockwise direction through the associated differential mechanism and train of gears. This operation or series of operations resulting in counter-clockwise movement of the arm 67 will tend to draw contact 65 out of engagement with blade 64 and the number of operations required to so clear the blade will depend upon the rapidity in drop of temperature. Under slow drop in temperature, one and usually not over two operations will be sufficient to clear the blade, whereas under very rapid and continued lowering temperature conditions, several successive operations may be required to clear the blade 64. In any event, however, the motivators 47 and 47a will continue to be operated as long as the blade is in engagement with contact 65, but will cease as soon as the blade is clear. In this manner, for every drop in outside temperature of one degree or a fraction thereof, the temperature setting of the thermostat 26 will be readjusted inversely and in some definite proportion to such outside temperature drops as is calculated to be correct for average conditions. In this connection it may be assumed, for the sake of example, that varying the boiler water temperature inversely with outside temperature fluctuations, degree for degree, will approximately maintain a desired constant temperature in the space and that the mechanism is designed on this basis. However, experiments have indicated that shifting of the burner's effective heat output rate of the heater inversely with outside temperature changes at the rate of two-thirds of a degree for each one degree change in outside temperature will be more nearly correct for average encountered building and radiation conditions.

If the change in outdoor temperature is in an upward direction, the blade 64 of thermostat 61 will, in response to such rise in temperature, move in a clockwise direction and will engage its cooperating contact 66, which as will hereinafter appear, results in shifting of the critical point of the thermostat 26 to a lower temperature level. This engagement of blade 64 with contact 66 establishes a circuit through solenoid 81 of relay 72 comprising a lead 91 extending from one side of the secondary of transformer T through contacts 87 of selector switch 74, blade 64, and its engaged contact 66, a lead 98 through solenoid 81 of relay 72, a lead 92 and interposed contact 77 of flash circuit maker 71, and lead B.

The relay 72 will now be momentarily closed when the bulb of selector switch 74 is tilted to the right in respect to Fig. 1, and during which time, the tube 75 of flash circuit maker 71 will pass through a horizontal position, and this momentary closing of relay 72 will produce a momentary closing of the three following circuits, to wit:

(a) A holding circuit comprising lead A extending from one side of the transformer to lead 93, a short lead 99, the now closed contacts 84 of relay 72, a lead 100, the solenoid 81 of relay 72, leads 98 and 92 through switch contacts 77 of flash circuit maker 71, and to lead B back to the opposite side of the transformer secondary. This circuit just described serves to hold the relay closed independently of the circuit through blade 62 and its closed contact 66. During the interval, the mercury is flowing between the contacts 77 of flash circuit maker 71.

(b) A circuit for solenoid 48a of motivator 46a comprising a short portion of lead A, lead 91 through contacts 87 of selector switch 74, to lead 97, lead 97 to solenoid 48a of motivator 46a, through the medium of a short lead 101, the said solenoid 48a, a lead 102 to the closed contacts 82 and 83 of relay 72, a lead 103 to lead 92, lead 92 through contacts 77, and lead B.

(c) A circuit for solenoid 48 of the motivator 46 comprising lead A and 22b through limit control switch 94 to a lead 104, lead 104 to the last said solenoid 48, the last said solenoid 48, a lead 105 to now closed contacts 82 and 83 of relay 72, lead 103 to lead 92, lead 92 through switch contacts 77 and lead B.

This momentary closing of last noted circuits (a), (b) and (c), as a result of engagement of blade 64 with contacts 66, will produce one simultaneous operation of motivators 46 and 46a, the former of which will produce a slight readjustment of thermostat 26 in a lower temperature maintaining direction, and the latter of which motivators will cause a slight clockwise movement of contact 66 tending to clear the blade. In case the blade 64 is not cleared in one operation, the motivators will repeat the operation each time the selector switch bulb 85 moves to the right of horizontal position until the blade does clear, and therefore, the reduction in effective heat input rate to the space will depend upon the number of operations of motivators 46 and 46a and will be substantially in proper proportion to the rise in outside temperature.

It will now be obvious that if changing outdoor temperatures was the only variable heat demand condition to be dealt with and the degree of shifting of boiler water temperature with respect to changes in outdoor temperature was correct for a particular installation, the adjustable heat output control comprised of thermostat 26 and switch 34 would always be maintained so adjusted as to maintain the effective heat output rate of the burner 14, as measured by boiler water temperature, at the correct level for maintenance of the desired space temperature. However, it will be equally obvious, firstly, that the requirements for adjustments of the thermostat 26 will be varied by other heat demand conditions than outdoor temperature, such, for example, as varying wind velocity and varying degrees of controlled ventilation, as through windows; and secondly, that the ratio resetting adjustment of thermostat 26 could not, in commercial practice, be calculated perfectly for the entire heat-requiring range of outside temperatures.

It is desirable, of course, that any heat control system should be completely automatic and this desire could not be realized if the adjusting action of the outdoor thermostat on the boiler thermostat 94 were modified by manual adjustments. For the purpose of providing for automatic correction in adjustments made by the outdoor adjusting control 24 on the control 23, I provide the secondary adjusting control 25 located in the space being heated.

The space located control unit 25 co-operates with control units 23 and 24, as will hereinafter appear, to two ends, to wit: (a) that of primarily establishing the heat input rate to the space required to maintain the space temperature at the desired point of say 70 degrees, at then existing variable heat demand conditions including heat demand temperature, and setting of boiler thermostat 26 so that its critical point is at the temperature level necessary to maintain the desired temperature in the space, this being accomplished independently of the outdoor unit 24; and (b) to automatically provide for readjustments of the thermostat 26 independently of the outside temperature when and only when the outdoor unit 24, operating in response to outdoor temperature changes, fails to obtain exactly the correct readjustments of the thermostat 26.

The space located control unit 25 comprises a spiral thermostat 106 anchored at its inner end to a pin 107 that projects from a mounting base 108 and having an outturned free end affording a switch blade 109. Mounted on the pin 107 for oscillatory pivotal movements in respect to the fixed base of support 108 is an arm 110 carrying contacts 111 and 112 for co-operation with the blade 109. The fixed base of support 108 serves as a common mounting base for thermostat 106 and the parts of selector switch 74. For the purpose of indicating the critical point of the thermostat 106, or in other words, the space temperature at which the blade 109 thereof will operatively engage one or the other of the contacts 111 or 112, there is provided on the pivotally adjustable arm 110, a pointer 113 which works over a temperature calibrated scale 114. The pointer 113 is positioned directly opposite a point 70 degrees since that is representative of the space temperature herein assumed to be desired. As long as the space temperature remains within a fraction of a degree of 70 degrees, the blade 109 of thermostat 106 will remain approximately centered in respect to co-operating contacts 111 and 112, but whenever the space temperature falls slightly below or rises slightly above the desired 70 degree space temperature, said blade 109 will engage one or the other of the contacts 111 and 112, depending upon the direction of space temperature fluctuation. At this point, attention is directed to the fact that the thermostat 106 is preferably of very sensitive nature and whereas the sensitivity thereof may be varied to meet different requirements, practice has indicated that such a degree of sensitivity as will cause engagement of one or the other of the contacts 111 and 112 under fluctuations in space temperature above or below the desired set point, of as little as one-tenth of one degree is practical in this system, since the normally tolerated fluctuation in boiler water temperature above and below the required point resulting from intermittent burner operation, will not be felt in the space in sufficient proportions to actuate the thermostat blade 106 into engagement with either of contacts 111 and 112.

If, however, we assume that, due to inaccuracy in adjustments made by outside unit 24, the space temperature falls something more than one-tenth of one degree below the desired 70 degree temperature, the blade 109 will engage contact 112, thereby closing a circuit through the solenoid 81 of relay 73 comprising leads A and 91, a lead 115 through contacts 86 of selector 74, thermostat blade 109, switch contact 112, a lead 116, lead 92 through solenoid 81 of relay 73 and contacts 77 of flash contact maker 71, and lead B. This circuit through solenoid of relay 73 is closed momentarily when the bulb 85 of selector switch 74 is tilted to the left, as shown in Fig. 1, and during which time the flash circuit maker 71 passes through horizontal position, and causes closing of relay 73 and momentary establishment of the following circuits, to wit:

(a) A holding circuit comprising lead A, lead 93, now closed contacts 84 of relay 73, lead 92 through solenoid 81 of relay 73 and contacts 77 of circuit maker 71, and lead B.

(b) A circuit for solenoid 48 of motivator 47 comprising lead A, lead 22b, high-low limit control switch 94, lead 95 through solenoid 48 of motivator 47, now closed contacts 82 and 83 of relay 73, lead 96, lead 92 through contact 77 of circuit maker 71, and lead B.

Closing of the above noted circuits (a) and (b) results in one operation of motivator 47, which will adjustably shift the critical point of thermostat 26 to a slightly higher temperature setting. Of course, the closing of the above named circuits and the resultant one operation will, on the basis of the selector switch timing above given, be repeated once every five minutes until thermostat blade 109 clears contact 112, and this will, of course, not happen until the temperature in the space has returned to the desired point 70 degrees.

If through inaccuracies in readjustments of thermostat 26 by control unit 24, the temperature in the space rises more than the tolerated one-tenth of one degree, for example, above the desired point, the blade 109 will engage contact 111 and establish a circuit through solenoid 81 of relay 72, comprising lead A, portion of lead 91 to lead 115, lead 115 through contacts 86 of selector switch 74, blade 109, contact 111, a lead 117 to lead 98, lead 98 to and through solenoid 81 of relay 72, lead 92 through contact 77, and lead B. This circuit through solenoid 81 of relay 72 will be momentarily completed when bulb 85 of selector switch 74 passes through the position shown in the drawings, and during which interval the switch bulb 75 of flash circuit maker 71 passes through a horizontal position, and will result in momentary closing of relay 72 and momentary establishment of the following circuits:

(a) A holding circuit comprising lead A, to lead 93, lead 93 to lead 99, lead 99 through contacts 84 of relay 72, lead 98 through solenoid 81 of relay 72, lead 92 through switch contacts 77 and lead B.

(b) A circuit for solenoid 48 of relay 46 comprising lead A, lead 22b, switch 94, lead 104 through solenoid 48 of relay 46, a lead 105, contacts 82 and 83 of relay switch 72, lead 103, lead 93 through contacts 77, and lead B.

Such momentary closing of circuits (a) and (b) above noted, results in one operation of motivator 46, of unit 23. This operation adjustably shifts the critical point of thermostat 26 to a slightly lower temperature, and the resultant effective heat output rate of the oil burning heater 14 to a slightly lower level, and, of course, this will result in a slight lowering of the temperature in the space. As will be evident from previous description, motivator 46 will repeat this operation once every five minutes, as long as blade 109 is in engagement with contact 111, but will discontinue operation as soon as the thermostat 109 is satisfied and cleared by return of space temperature to normal.

It will now be obvious that the thermostatic control unit 25 is capable, acting through the medium of relays 72 and 73, the motivating units 46 and 47 and associate elements described, of readjusting the thermostat 26 independently of the control unit 24, but when incorporated in the complete system described, is called upon to do so when and only when the said control unit 24 has failed to accurately accomplish resetting adjustments of the thermostat 26. Of course, when so used, readjustments of the thermostat 26 by the action of room control unit 25 will not be frequent since the error in adjustments by control unit 24 are usually negligible or, at least, not very material under such outdoor temperature changes as ordinarily occur within any 24 hour period.

When the complete system described is employed, one of the very important functions of the control unit 25 is the primary automatic establishment of the heat input rate to the space necessary to maintain the desired temperature in the space existing at the time the control mechanism is installed and set into operation. This, of course, must be accurately accomplished before the outdoor control unit 24 will be of any use. Whereas, such preliminary adjustments of the thermostat 26 could be made manually, it will be obvious that such would be a very tedious procedure. However, in the present instance, when this mechanism is employed, no manual adjustments need be made, it being only necessary to properly connect the several units, after which the control unit 25 will operate through motivator 46 or 47, to establish the correct setting of thermostat 26. If the operator makes the proper connections, he may ignore adjustments, leave the job for a period of a few hours, and when he returns, he will find that the adjustments have been made correctly during his absence.

Whereas, the complete system herein described is considered the most highly desirable from the standpoint of accuracy in temperature control, and whereas the cost thereof is relatively low as compared to other systems, which include outdoor temperature affected units, it is appreciated that there is a demand for very high grade control units which can be produced at a very minimum of expense and to meet such demand, I propose to employ the system described independently of the outdoor control unit 24 and in this case, of course, the space located control unit 25 would become the sole adjuster and readjuster for the thermostat 26 of control unit 23.

For the purpose of illustration, such a modified control system could be obtained by omitting all parts and wires to the right of the broken line X—X on Fig. 1. This modified control system would not realize the same high degree of temperature maintenance as the complete system, in that an actual slight change in space temperature would always be required to effect readjustments of the effective heat output rate of the burner, but even with the modified system, the amount of temperature fluctuation in the space would be small as compared to conventional systems. In fact, under reasonably consistent heat demand conditions, the modified control system will hold the temperature in the space as close as the complete system, including the outdoor control 24, but the modified system, due to the elimination of the outside control 24, would suffer a slight loss in efficiency under changing heat demand conditions. For the modified system, the selector switch mechanism 74 would, in practice, be omitted since it would perform no useful function, but for the purpose of illustration, may be left in the circuit. Obviously omission of selector switch 74 would call for a reduction in the speed of oscillation of the flash circuit maker 71 to one-half that given in the example if the same effective timing were to be preserved.

For co-operation with the high-low limit control switch 94, the gear segment 39 of control unit 23 is provided with switch-actuating lugs 39a and 39b. When, in response to the adjusting action of control unit 24 or 25, or the combined action of units 24 and 25, the gear segment 39 has been adjustably shifted in a counter-clockwise direction to a maximum high boiler water temperature maintaining position, 178 degrees for example, the lug 39a will engage the extended end of the center arm of switch 94 and will move said switch arm out of engagement with the right-hand arm of switch 94. This moving of the center arm of switch 94 out of engagement with the right-hand arm thereof, will open the circuit through the solenoid 48 of motivating unit 47, thereby rendering motivator 47 inoperative. This, of course, will result in maintenance of the maximum desired burner heat output rate until such a time as space or demand conditions call for a lower heat output rate, which latter can be readily brought about since motivating unit 46 has not been affected by the switch 94. When the gear segment 39 has been shifted in a clockwise direction to a maximum low heat output level position, 80 degrees boiler water temperature, for example, the lug 39b will engage the center arm of switch 94 and move the same out of engagement with the left-hand arm of said switch 94, thereby opening the two following circuits, to wit: (a) the circuit through the solenoid 22a of relay switch 22; and (b) the circuit through the solenoid 48 of motivating unit 46.

The opening of the circuit through the solenoid of burner relay 22 causes opening of the relay switch 22, and this renders the burner 14 inoperative whether switch 34 be open or closed. The opening of the circuit for motivating unit 46 renders said unit 46 inoperative. The burner 14, adjustable control unit 23 will now remain inoperative until space temperature or outside heat demand conditions call for heat in the space.

It will be obvious to those skilled in the art that the complete system of Figs. 1 to 3, inclusive, or the described modified system omitting the outside control unit 24 could readily be adapted to hot air heating systems, merely by placing the thermostat 26 in very close proximity to the crown sheet of a hot air furnace, for example. In this case, the control comprised of thermostat 26 and switch 34 would tend to so control operation of the oil-burning heater 14 as to maintain, within the desired limits, a constant crown sheet temperature, the crown sheet becoming in this case, means for transferring heat from the heater 14 to the air space.

Figure 6:
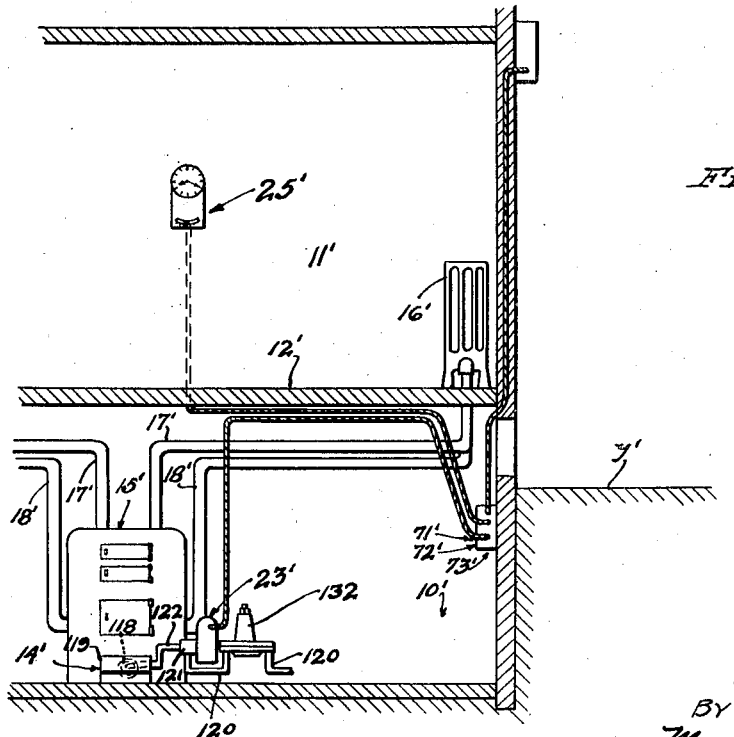
Fig. 6 is a view very similar to Fig. 5 but illustrating a preferred application of the control apparatus of Fig. 2.

*Description of Figs. 4 to 6, inclusive*

With reference first to Fig. 6, the basement of the building is indicated by 10', the space to be heated by 11', the first story floor by 12', and an outer wall of the building by 13'. The heating system of Figs. 4 to 6, inclusive, is the same as that of Figs. 1 to 3, inclusive, except that a gas-burning heater has been substituted for the oil-burning heater of Figs. 1 to 3, and hence the burner of Figs. 4 to 6, and the various other parts of the heating system are indicated by numerals corresponding to those assigned to like parts in Figs. 1 to 3, inclusive, plus the prime mark. The burner head proper of the burner 14' being contained within the fire box portion of the boiler 15' is not here shown, but the Venturi tube-acting portion of the gas and air delivery manifold thereof is partially shown in Fig. 4, and by dotted lines in Fig. 6, being indicated by the numeral 118. The Venturi tube 118 is contained within the customary damper controlled draft duct 119 and receives its main supply of gas from a suitable source of supply, such as a city gas main, not shown, through the medium of a delivery pipe 120, a gas-regulating valve 121 and a delivery tube 122, extending from the valve 121 and projecting axially into the Venturi tube 118. The valve 121 is adjustable to vary the amount of gas delivered to burner and will maintain the gas input rate to the burner and hence the effective heating rate of the burner 14' at any desired level determined by its adjustment. In fact, it may be said that the valve 121 serves the same purpose in connection with the gas burner 14' as does the control comprised of thermostat 26 and switch 34 in connection with the oil-burning heater 14 in Figs. 1 to 3, to wit: to control the effective heating rate of the burner.

Valve 121 comprises a casing 123 having mounted therein, for axial movements in respect thereto and to delivery tube 122, a needle valve 124. The needle valve 124 is provided with a conical tip 125 that co-operates with a valve seat 126. For the purpose of providing a gas-tight chamber 127, within the valve casing 123 between the point of gas inlet thereto and gas outlet therefrom, there is provided a partition-acting diaphragm 128. This diaphragm 128 is of the annularly corrugated metal type, being secured at its periphery to the interior of the valve casing and near its axis to the needle valve 124 which extends axially therethrough. It will be obvious that the diaphragm 128 will permit axial movements of the needle valve 124 which is guided for true axial movements in respect to the delivery tube 122 by means of spider supporting bearings 129.

The Venturi tube 118 serves in gas burners of this type as a mixing chamber or manifold for mixing gas and air in the proper proportions for burning, air being drawn into the manifold through an annular passage 130 surrounding the delivery end of the gas tube 122 under vacuum produced in the open end of the Venturi tube under injection of gas. In accordance with customary practice, the gas burner 14' will be provided with a gas pilot light and although such pilot light is not here shown, a supply pipe therefor is indicated by 131 and branches off of the main delivery pipe 120 ahead of the valve 121. Also, in accordance with conventional practice, there is interposed in the gas line 120 ahead of the burner control and valve 121, a pressure reducing valve 132 which not only reduces the gas pressure but maintains a substantially constant gas pressure in the line on the burner side thereof.

The control mechanism of Figs. 4 to 6, inclusive, is substantially a duplicate of the complete system shown in Figs. 1 to 3, inclusive, except for the substitution therein of the control valve 121 for the control thermostat 26 and switch 34 of Figs. 1 to 3, and the further substitution therein of a magnetic valve 22' for the burner relay switch 22 of Figs. 1 to 3. The magnetic valve 22' is of gravity closed type but is normally maintained open by a circuit through its solenoid 22a. In view of the above noted similarity between the control system of Figs. 4 to 6, and 1 to 3, all parts and circuit leads of the control mechanism of Figs. 4 to 6, which correspond to parts or circuit leads of Figs. 1 to 3, are indicated by like numerals plus the prime mark.

The magnetic valve 22' is interposed in and controls a gas by-pass connection comprised of conduit 131 and a conduit 133, which by-pass connection has also interposed therein a manually operated valve 134. The gas-regulating valve 121 forms a part of the adjustable control unit 23' and the needle 124 thereof is operated from the reversible differential motor thereof, through the medium of the driving connections including gear 41', a beveled gear 135 rigidly carried with or formed as an integral part of the gear 41', and intermeshing bevel gear 136 having a long internally threaded nut-acting hub 137 journaled in a suitable bearing 138, and a valve-actuating stem 139 working in the nut-acting hub 137 and operatively connected to the needle 124. The valve casing 123 and bearings 138 are rigidly mounted in common at 140 to the base plate 29' of unit 23'. Nut-acting gear hub 138 of gear 136 is held against axial movements in the bearing 138 by engagement of one side of the bearing 138 with a gear hub shoulder 141, and engagement of the other side of the bearing with a retaining nut 142 screw-threaded onto the hub 138 and held in place by a suitable lock nut.

The valve-actuating stem 139 works in an axial bore 143 of the valve needle 124 and is held against rotary movements in respect to needle 124 by means of a pin 144 that is anchored at its opposite ends in the needle 124 and works through a slot 145 in the valve-operating stem 139. The slot 145 permits limited axial movements of the stem in respect to the needle 124 and the stem 139 and needle 124 are normally held in maximum extended relation by means of an interposed coiled compression spring 146.

*Operation of Figs. 4 to 6, inclusive*

When the control apparatus is completely installed, the operator may set the system into action without regard to the adjusted position of the needle 124 of valve 121. For the sake of illustration, we may assume that the valve happened at the time to be in a partially open position, as shown in Fig. 4. The gas burner 14' will now operate at an intermediate heat output level determined by the more or less accidental adjustment of the needle valve 124. Now, if as heat is transmitted to the space 11' through the medium of boiler 15', heating medium and radiators 16' is not sufficient and the temperature in the space becomes or is below the desired 70 degrees, for example, the blade 109' of thermostat 106' of the space unit 125' will engage the co-operating switch contact 112', thereby conditioning the circuit of solenoid 81' of relay switch 73' for closing when the switch bulb 85' of selector switch 74' passes through the position shown in Fig. 4 and during which time the bulb 75' of flash circuit maker 71 passes through a horizontal position. The relay 73' will close each time the circuit through its solenoid 81' is closed, and this momentary closing of relay switch 73' will, of course, re-occur intermittently until the temperature in the room has been satisfied.

This closing or series of closing of relay 73' results in one or a series of closings of a circuit through solenoid 48' of motivator 47' to produce one operation of motivator 47' for each closing of a circuit thereof. Each operation of motivator 47' will produce a slight clockwise movement of the gears 41' and 135 which is transmitted to the nut-acting hub 137 through gear 136. This rotation of gear 136 and its nut-acting hub 137 will, due to the threaded engagement between nut 137 and valve-adjusting stem 139, produce a slight outward movement of the stem 139 and needle 124, which results in increased opening of the valve passage and a consequent increased heating rate of the burner. When the temperature in the space has been increased to the desired 70 degree temperature, the thermostat blade 109' will disengage contact 112'. Now, if the thermostat contacts 65' and 66' of the outdoor control unit 24' were improperly adjusted at the outset, with respect to the existing outside temperature, the blade 64' of thermostat 61 will be in engagement with one or the other of said contacts. Now, it will be obvious that if the blade 64' is in engagement with one or the other of contacts 65' or 66', the circuit of the solenoid 81' of relay 73' or relay 72' will be closed intermittently each time the bulb 85' of selector switch 74' tilts to either side as long as the blade 64' remains in engagement with contacts 65' or 66'. As a result of intermittent operations of relay 72' or 73', one or the other of motivators 46a' and 47a' will be operated and will tend to move the contacts 65' and 66' to a position where the blade 64' will be clear.

Of course, it will further be seen that for each operation of motivator 46a' as a result of engagement of blade 64' with contact 66', there will be a simultaneous operation of motivator 46' and for each operation of motivating unit 47a' as a result of engagement of blade 64' of contact 65' there will be a simultaneous operation of motivator 47'. If the latter is the case, the motivating unit 47' will initially be operated alternately, first, as a result of engagement of blade 109' with co-operating contact 112' and secondly, as a result of engagement of blade 64' with contact 65', and in this instance, the initial automatic adjustment of valve needle 124 will be quite rapid, since units 25' and 24' are each working in the same direction, but should the thermostat blade 64' initially engage contact 66', the motivators 46' and 47' would be alternately operated until the blade 64' had been cleared of contact 66, and this alternate operation of motivators 46' and 47' would result in nullifying effect as far as the needle valve 124 is concerned, and the effective readjustments of the needle valve 124 would not commence until the blade 64' had become cleared, after which continued operation of the motivating unit 47' as a result of continued engagement of blade 109' with contact 112' would start effective readjustments of the valve needle 124.

When the adjustments of needle valve 124 have been completed for primarily existing demand conditions, the heat output level of the burner will remain constant until the demand conditions change. When demand conditions do change, the units will function to readjust the needle valve 124 to obtain exactly the size flame required to heat the space under the new conditions. Whereas it was assumed at the start that the room or space temperature was below normal at the start of the mechanism into operation, it will be seen that if the reverse were true, that is, the temperature in the space was primarily above normal and the blade 109 was in engagement with contact 111', the reverse action from that described would be obtained, the needle valve 124 then being adjusted to reduce the amount of gas to the burner.

It will be seen that as long as the high-low limit control switch 94' remains closed, a circuit through the solenoid 22a' of magnetic valve 22' will be completed and the valve 22' will be held open. When demand conditions are approaching the maximum low heat requiring level, the needle valve 124 will completely close valve 121, but a minimum low fire will be maintained by gas supplied through the shunt connection 133 in which the now open magnetic valve 22' is inserted. At the time the needle 124 completely closes the orifice of valve 121, the lug 39b of gear segment 39' will be very nearly in engagement with the extended center arm of the high-low limit control switch 94 and if demand conditions become still slightly further reduced, the gear segment 39' will be moved further in a clockwise direction until the lug 39b thereof completely engages and moves the center arm 94' out of engagement with the left-hand arm thereof, such further movement being permitted by the yielding action of the compression spring 146 after closing of the needle valve 124, and resulting in opening of the circuit through the solenoid of magnetic valve 22', which latter results in closing of the valve. This above noted opening of the left-hand side of switch 94' also results in opening of the circuit through the solenoid 48' of motivating unit 46', which, of course, renders the unit 46' inoperative. Now with the closing of the valve 22', the burner will be completely inoperative, except for the pilot light which has not been affected, and will remain so until heat is again required in the space.

When heat is again required in the space, the thermostat blade 109' will engage contact 112' which will result in momentary and intermittent closing of the relay 73' and momentary and intermittent operation of the motivating unit 47'. This operation or series of operations of motivating unit 47' will move gear segment 39' in a counter-clockwise direction. As soon as such counter-clockwise movement of gear segment 39' has been sufficient to permit re-closing of the limit switch 94 the circuit through the solenoid of magnetic valve 22' will be re-established, said valve 22' will open, and combustion will be re-established at the maximum rate permitted by set manual adjustment of valve 134. If this minimum rate of combustion is not sufficient to satisfy the heat requirements in the space and clear blade 109' from contact 112', the solenoid 47' will continue to operate until disengagement of blade 109' with contact 112' occurs, and such operation or operations of motivating unit 47 will continue to move the gear segment 39 in a counter-clockwise direction, and the gears 41' and 135 in a clockwise or valve-opening direction. Under such movements, the valve needle 124 will begin to be retracted to open position as soon as the slack between the pin 144 and the end of slot 145 has been taken up, and from this point on, the needle 124 will be moved back and forth to meet requirements.

When the heat output level of the burner has been automatically adjusted to a maximum desired high flame or burner output level, lug 39a' of gear segment 39' will engage the center arm of switch 94' and open the circuit through motivating unit 47' thereby preventing further opening of the valve 121.

What I claim is:

1. The method of temperature maintenance of a closed space which includes primarily automatically establishing a tempering rate necessary to maintain the space temperature within a predetermined tolerable variation range under primarily existing demand conditions and automatically establishing a definite scale relation between different outside temperatures and tempering rates that will approximately maintain the space temperature within the tolerable tempering range under range variations in outside temperature, and thereafter automatically controlling the tempering of the air in the space in accordance with the primarily established scale relation to outside temperature independently of space temperature fluctuations within the tolerable range, and thereafter, under variations in space temperature to or beyond the tolerable range, automatically varying the tempering rate to re-establish the same at a new level necessary to maintain space temperature within the tolerable range and automatically re-establishing the temperature scale relation between outside temperature and tempering rate range, and subsequently maintaining the newly established temperature scale relation between outside temperature and tempering rate range independently of space temperature until space temperature again fluctuates beyond the tolerable range.

2. In an air conditioning system, the combination with an air conditioning device associated with a space, of adjustable means for variably regulating the effective tempering rate of the conditioning device and maintaining the same at different levels determined by its adjustment, and automatic control mechanism for adjusting the said adjustable means in a desired relation to changes in an air condition outside of the space, said automatic control mechanism comprising a reversible electric motor for reversibly adjusting said adjustable regulating means, an air condition sensitive element subject to the influence of changing conditions outside of the space, a switch comprising laterally spaced relatively fixed contacts and a common relatively movable contact, said relatively movable switch contact being operatively associated with said air condition sensitive element and being adapted to be moved thereby between and into opposite of said relatively fixed switch contacts, reversible electric motor means for moving the said relatively fixed switch contacts with respect to their co-operating air condition responsive movable contact, circuits controlled by said switch for operating said reversible motors simultaneously, the common movable switch contact and one of its co-operating relatively fixed contacts controlling operation of each of said motors in one direction and the common movable switch contact and the other of said relatively fixed contacts controlling operation of said reversible motors in the other direction, the direction of relative movement of the relatively fixed switch contacts by their co-operating motor under engagement of the common movable switch contact with either thereof being in a direction to bring the engaged contact out of engagement with air condition responsive movable contact.

3. The structure defined in claim 2 in further combination with space air controlled means independently controlling operation of the first named electric motor.

4. The structure defined in claim 2 in further combination with space air controlled means independently controlling operation of the first named electric motor, said last noted means including a switch made up of spaced relatively fixed contacts and a co-operating relatively movable contact, and an air conditioned sensitive actuating element subject to air in the space and arranged to operate the last said movable switch contact.

WILLIAM J. PELTIER.